(12) United States Patent
Dehenre et al.

(10) Patent No.: US 11,588,748 B1
(45) Date of Patent: Feb. 21, 2023

(54) RESOURCE ALLOCATING AND SCHEDULING FOR A NETWORK

(71) Applicant: 7-Eleven, Inc., Irving, TX (US)

(72) Inventors: Onutase Dehenre, Frisco, TX (US); Kushal Gupta, Coppell, TX (US); Mukul Jindal, Roanoke, TX (US); Stephen Patrick Kinch, Fort Worth, TX (US)

(73) Assignee: 7-ELEVEN, INC., Irving, TX (US)

( * ) Notice: Subject to any disclaimer, the term of this patent is extended or adjusted under 35 U.S.C. 154(b) by 0 days.

(21) Appl. No.: 17/452,376

(22) Filed: Oct. 26, 2021

(51) Int. Cl.
*H04L 47/72* (2022.01)
*H04L 47/80* (2022.01)
*H04L 47/70* (2022.01)

(52) U.S. Cl.
CPC .......... *H04L 47/72* (2013.01); *H04L 47/808* (2013.01); *H04L 47/822* (2013.01)

(58) Field of Classification Search
CPC ..... H04L 45/586; H04L 67/567; H04L 45/02; H04L 45/3065; H04L 45/42
See application file for complete search history.

(56) References Cited

U.S. PATENT DOCUMENTS 11,036,554 B1 * 6/2021 Prock ................. G06F 9/45558
2020/0334587 A1 * 10/2020 Shrivastava ........... G06Q 10/02
2021/0294661 A1 * 9/2021 Turner ................. G06F 9/5038

* cited by examiner

*Primary Examiner* — Mohamed A. Wasel
*Assistant Examiner* — Jihad K Boustany
(74) *Attorney, Agent, or Firm* — Baker Botts L.L.P.

(57) ABSTRACT

A device configured to receive a resource reservation request that identifies a user and a resource. The device is further configured to generate a resource allocation that includes an association between the user, location information for the resource, a resource identifier for the resource, and a token value. The device is further configured to associate the resource allocation with a time interval indicating a deadline for using the resource allocation. The device is further configured to receive a reservation verification request from a network device. The device is further configured to determine the location information for the network device is within a predetermined distance from the location information for the resource, to determine the resource identifier matches the resource identifier for the resource, and to determine a current time is within the time interval. The device is further configured to generate resource allocation instructions authorizing access to the resource.

20 Claims, 3 Drawing Sheets

RESOURCE ALLOCATING AND SCHEDULING FOR A NETWORK

TECHNICAL FIELD

The present disclosure relates generally to resource and process management for a network, and more specifically to resource allocating and scheduling for a network.

BACKGROUND

Existing computer systems may be configured to allocate resources (e.g. hardware resources and/or software resources) within a network. For example, a computer system may allocate a set of resources to a network device so that the network device can perform some tasks. Managing and allocating a system's resources poses a technical challenge because systems have a limited number of resources that can be allocated. Existing computer systems lack the ability to reserve and allocate resources for future use by a user. In some instances, a user may request more resources than they need. In this case, the requested resources will be unavailable to other network devices, which limits a system's ability to provide support and resources for other network devices. In addition, any over-consumption of resources reduces the system's ability to provide services to its users and reduces the throughput of the system which degrades the overall performance of the system.

SUMMARY

The disclosed system provides several practical applications and technical advantages that overcome the previously discussed technical problems. For example, the disclosed system provides a practical application by employing a resource management device that is configured to collect information about the resources that are currently available within a network, to share the collected information with a user, and to allow the user to reserve a resource for a predetermined amount of time. This process provides a technical advantage by allowing the computer system to schedule its resource allocations so that resources are available to its users in the future. This process improves the operation of the computer system by allowing resources to be scheduled and allocated to its users without over-allocating the available resources, which would limit the system's ability to provide resources to other users. In other words, this process improves the operation of the computer system by improving resource utilization which in turn improves the throughput and the overall operation of the computer system.

In addition, a computer system may have numerous network devices that can provide resources and services to its users. Existing systems lack the ability for a user to efficiently query the network devices to determine which resources are available. In contrast, the disclosed system provides a technical advantage by employing the resource management device to act as an intermediary between a user and multiple network devices. The resource management device allows a user to collect information from multiple network devices without having to individually query each network device. This configuration provides a technical improvement by reducing the amount of messaging a user would have to perform to request information from multiple network devices. By reducing the amount of data messaging traffic within the network, the computer system is able to reduce network bandwidth consumption and improve network utilization which thereby improves the operation of the computer system. Thus, the disclosed system provides a technical advantage by allowing a user to efficiently collect information from multiple network devices to determine which resources are available using their user device without having to communicate directly with each network device.

The disclosed system also provides a technical advantage by using the resource management device to manage the resources from multiple network devices. In existing systems, each network device is typically responsible for managing and allocating its resources. In this configuration, the network devices may be share information with each other about their resource availability, which could lead to load imbalances within the network. In contrast, the resource management device is configured to communicate with and manage the resources of the network devices to provide better load balancing for the network. This process improves the operation and efficiency of the network without having to modify the way that the network devices operate.

In one embodiment, the computer system comprises a device that is configured to receive a resource information request from a user device. The resource information request comprises location information for the user device. The device is further configured to send resource availability information to the user device network based on the location information for the user device. The resource availability information identifies available resources within the network based on the location information for the user device and a token value for each available resource. The device is further configured to receive a resource reservation request from the user device. The resource reservation request identifies a user and a first resource that is available within the network. The device is further configured to identify a first token value that corresponds with the first resource and to generate a resource allocation that comprises an association between the user, the location information for the first resource, a first resource identifier for the first resource, and the first token value. The device is further configured to associate the resource allocation with a first time interval indicating a deadline for using the resource allocation.

At a later time, the device is configured to receive a reservation verification request from a network device. The reservation verification request identifies the user, a second resource identifier, and location information for the network device. The device is further configured to identify the resource allocation associated with the user. The device is further configured to validate the reservation verification request by determining whether the location information for the network device is within a predetermined distance from the location information for the first resource, determining whether the first resource identifier from the resource allocation matches the second resource identifier, and determining whether the current time is within the first time interval identified by the resource allocation. The device is further configured to generate resource allocation instructions authorizing access to the first resource in exchange for the first token value in response to determining that the reservation verification request is valid and to send the resource allocation instructions to the network device.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

Computer System Overview

Figure 1:
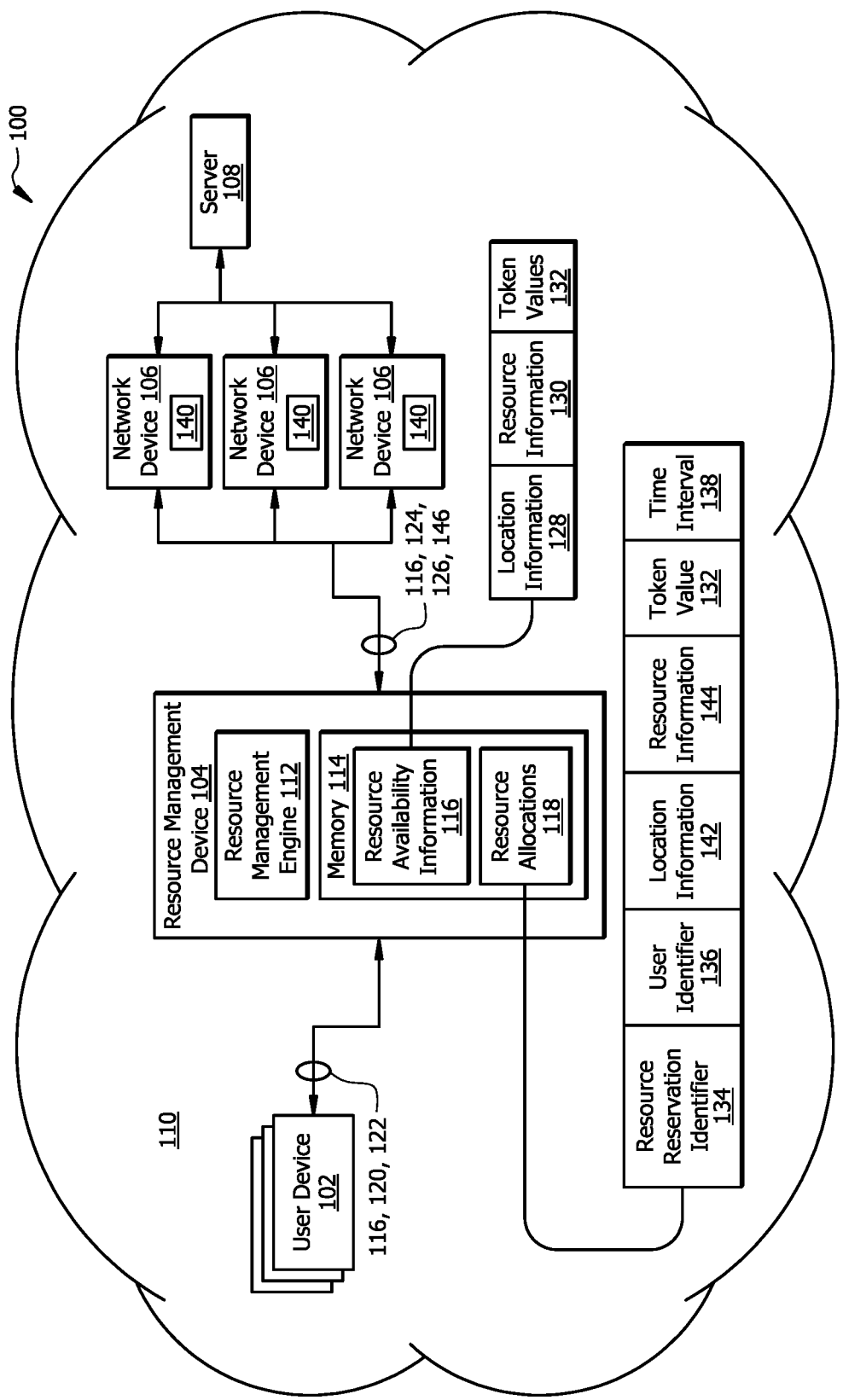
FIG. 1 is a schematic diagram for a computer network configured to use resource allocations and scheduling.

FIG. 1 is a schematic diagram of an embodiment of a computer system 100 that is generally configured to use resource allocations and scheduling for providing resources 140 to users. The computer system 100 is generally configured to allow a user to reserve a resource 140 by generating a resource allocation 118 that can be used at a later time by the user. Examples of resources 140 include, but are not limited to, fuel resources (e.g. gasoline or propane), energy resources, network bandwidth, hardware resources (e.g. processors or memory), software resources (e.g. software applications or virtual machines), or any other suitable type of resource 140. This process allows the computer system 100 to ensure that resources 140 are available for the user in the future. The computer system 100 is further configured to validate a user's request for access to a resource 140 and to grant access to the requested resource 140.

In one embodiment, the computer system 100 comprises a plurality of user devices 102, a resource management device 104, a plurality of network devices 106, and a server 108 that are in signal communication with each other within a network 110. The resource management device 104 may also be in signal communication with other network devices within the network 110. The network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 110 may be configured to support any suitable type of communication protocol as would be appreciated by one of ordinary skill in the art.

User Devices

A user device 102 is a hardware device that is generally configured to provide hardware and software resources to a user. Examples of the user device 102 include, but are not limited to, a smartphone, a tablet, a laptop, a computer, a smart device, or any other suitable type of device. The user device 102 comprises a graphical user interface (e.g. a display or a touchscreen) that allows a user to view information on the user device 102. The user device 102 may comprise a touchscreen, a touchpad, keys, buttons, a mouse, or any other suitable type of hardware that allows a user to provide inputs into the user device 102. The user device 102 is configured to allow a user to view information (e.g. resource availability information 116) and to send a resource reservation request 122 to reserve a resource 140. Examples of resources 140 include, but are not limited to, fuel resources (e.g. gasoline or propane), energy resources, network bandwidth, hardware resources (e.g. processors or memory), software resources (e.g. software applications or virtual machines), or any other suitable type of resource 140. In one embodiment, the user device 102 is configured to allows a user to view resource availability information 116 and to send a resource reservation request 122 to reserve a resource 140 using an application that is installed on the user device 102. An example of a user device 102 performing this process is described in FIG. 2.

Network Devices

Examples of a network device 106 include, but are not limited to, a server, an access point, a computer, a fuel station pump or terminal, or any other suitable type of network device. Each network device 106 is a hardware device that is generally configured to provide one or more resources 140 to a user. As an example, a network device 106 may be a fuel pump or terminal at a gas station. In this example, the network device 106 may be configured to provide different types of fuel resources (e.g. different types or grades of gasoline). As another example, the network device 106 may be an electrical power generator. In this example, the network device 106 may be configured to provide energy resources such as electrical power. As another example, the network device 106 may be a server or access point. In this example, the network device 106 may be configured to provide network resources such as access to a network or network bandwidth. As another example, the network device 106 may be a server or controller that manages hardware and/or software resources for the computer system 100. In this example, the network device 106 may be configured to provide access to the computer system's resources such as processors, memory, software applications, virtual machine, or any other suitable type of hardware or software. In other examples, the network device 106 may be configured to provide access to any other suitable type of resource 140.

Each resource 140 is associated with a token value 132 that identifies an amount of tokens for obtaining access to the resource 140. In one embodiment, the token value 132 is a price for obtaining access to the resource 140. Examples of tokens include, but are not limited to, currency, credits, and points from a point system. For example, the computer system 100 may be configured to implement a point system that provides points or credits to its users. In this example, a user may use their points in exchange for access to a resource 140. As another example, the computer system 100 may be configured to use a currency. In this example, a user may provide currency in exchange for access to a resource 140. In other examples, the computer system 100 may be configured to use any other suitable type of token that can be exchanged for access to a resource 140. Over time, the token value 132 that is associated with a resource 140 may vary. For example, the token value 132 for a resource 140 may vary based on the amount of the resource 140 that is available and/or the amount of demand for the resource 140.

Server

Examples of the server 108 include, but are not limited to, a network server, a computer, or any other suitable type of network device. In one embodiment, the server 108 may be a global controller (e.g. a hardware controller) that is generally configured to control and/or to provide instructions for operating one or more network devices 106. For example, the server 108 may be configured to periodically update the token values 132 for the resources 140 that are provided by each network device 106. In other examples, the server 108 may be configured to monitor the operation of one or more network devices 106 and to provide any required maintenance such as firmware or software updates.

Resource Management Device

Examples of a resource management device 104 include, but are not limited to, a server, an access point, a computer, or any other suitable type of network device. In one embodiment, the resource management device 104 comprises a resource management engine 112 and a memory 114. Additional details about the hardware configuration of the resource management device 104 are described in FIG. 3. The memory 114 is configured to store resource availability information 116, resource allocations 118, and/or any other suitable type of data.

In one embodiment, the resource management engine 112 is generally configured to provide resource availability information 116 to users. The resource availability information 116 generally comprises information about the resources 140 that are currently available within the network 110. In one embodiment, the resource availability information 116 may comprise location information 128 for a network device 106, resource information 130 for available resources 140, and token values 132 for the available resources 140. The location information 128 comprises information that identifies a physical location for a network device 106 and its resources. Examples of location information 128 include, but are not limited to, Global Positioning System (GPS) coordinates, a physical address, or any other suitable type of information that identifies a physical location of the network device 106 and its resources 140. The resource information 130 comprises information about the resources 140 that are currently available from the network device 106. For example, the resource information 130 may comprise resource identifiers that uniquely identify each type of resource 140 that is available. Examples of a resource identifier include, but are not limited to, a name, an alphanumeric code or value, or any other suitable type of identifier that uniquely identifies a resource 140 or a type of resource 140. The token values 132 identify the current amount of tokens that are required to obtain a resource 140 from a network device 106. In other embodiments, the resource availability information 116 may further comprise any other suitable type of information associated with a network device 106 and its resources 140.

The resource management engine 112 is further configured to generate resource allocations 118 for users. A resource allocation 118 generally comprises information about a resource 140 that a user has reserved for the future. In one embodiment, a resource allocation 118 comprises a resource reservation identifier 134, a user identifier 136, location information 142 for where a reserved resource 140 may be obtained from, resource information 144 about the reserved resource 140, a token value 132 for obtaining the reserved resource 140, and a time interval 138 for when a user can obtain the reserved resource 140. The resource reservation identifier 134 comprises information for identifying a resource allocation 118. Examples of a resource reservation identifier 134 include, but are not limited to, a name, an alphanumeric code or value, or any other suitable type of identifier that uniquely identifies a resource allocation 118. The location information 142 comprises information that identifies one or more physical locations for where a reserved resource 140 can be obtained from. Examples of location information 142 include, but are not limited to, GPS coordinates, physical addresses, business identifiers (e.g. a business name or an entity number), or any other suitable type of information that identifies where a reserved resource 140 can be obtained from. The resource information 144 comprises information about a reserved resource 140. For example, the resource information 144 may comprise a resource identifier that uniquely identifies a resource 140 or a type of resource 140. The token value 132 identifies the number of tokens required for obtaining the reserved resource 140. Since the demand for resources 140 changes over time, the computer system 100 locks in a token value 132 at the time of the request that can be used later to obtain a resource 140. The time interval 138 identifies a deadline (e.g. a day and/or time) for using the resource allocation 118. After the time interval 138 has expired, a user can no longer access the reserved resource 140. In other embodiments, a resource allocation 118 may further comprise any other suitable type of information associated with a network device 106 and its resources 140.

The resource management engine 112 is further configured to validate a user's request for access to a resource 140 and to grant access to the requested resource 140. This process allows the user to obtain access to a resource 140 from a network device 106 sometime after they have reserved the resource 140. An example of the resource management engine 112 performing these operations is described in FIG. 2.

Data Access Process

Figure 2:
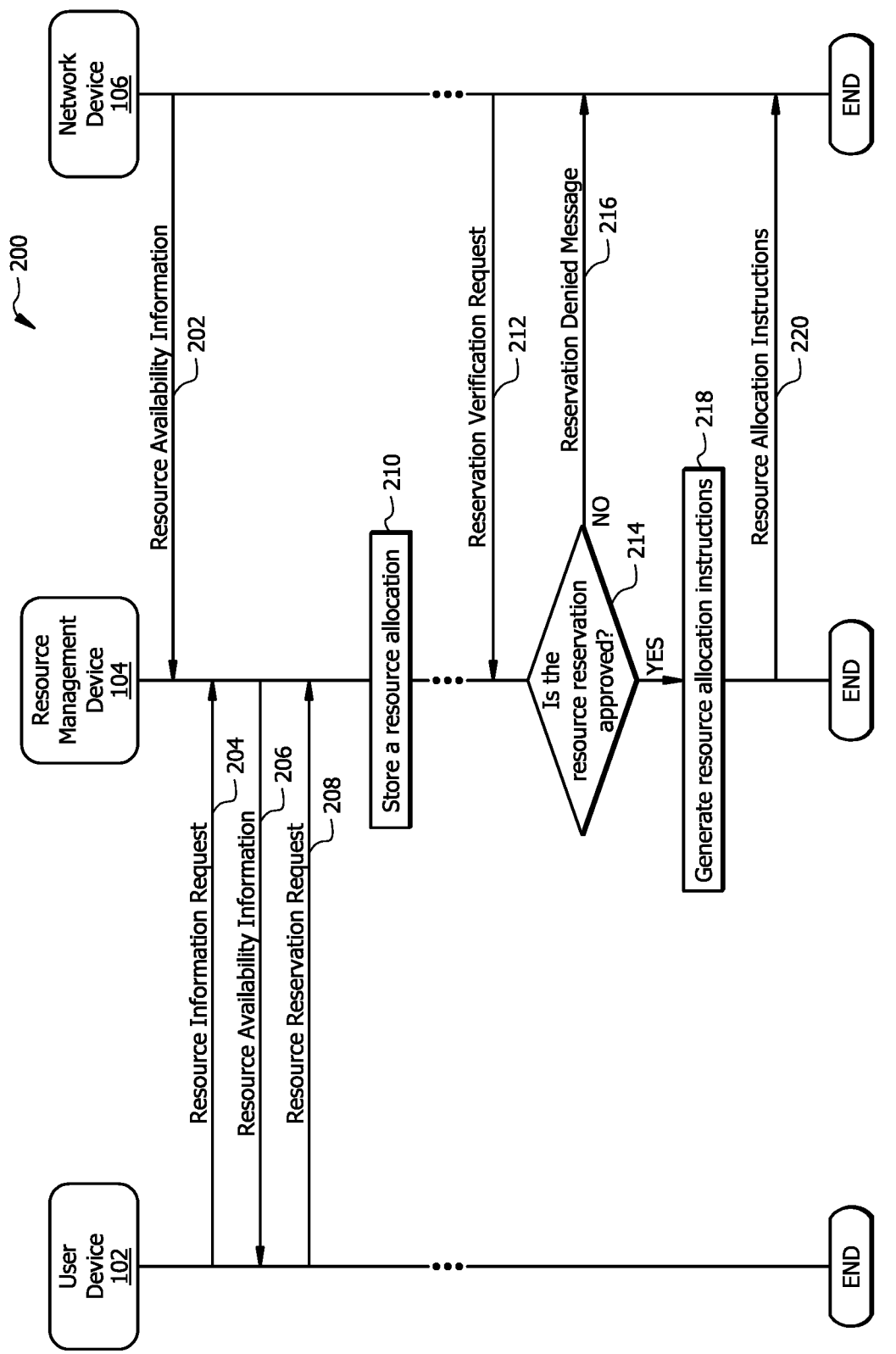
FIG. 2 is a flowchart of an embodiment of a resource allocation process for the computer network.

FIG. 2 is a flowchart of an embodiment of a resource allocation process 200 for the computer system 100. The computer system 100 may employ process 200 to allow a user to reserve a resource allocation 118 that can be used at a later time by the user. This process allows the computer system 100 to ensure that resources 140 are available for the user in the future. Since the demand for resources 140 changes over time, the computer system 100 locks in the current token value 132 at the time of the request which allows the user to be prepared in advance when requesting access to the reserved resource 140. The computer system 100 may also employ process 200 to validate a user's request for access to a resource 140 and to grant access to the requested resource 140.

Storing Resource Allocations

At operation 202, the resource management device 104 receives resource availability information 116 from one or more network devices 106. The resource availability information 116 comprises information about the resources 140 that are currently available within the network 110. In one embodiment, the resource availability information 116 comprises resource information 130 that identifies a type of resource 140 that is currently available, location information 128 for a network device 106 that is configured to provide a resource 140, and a token value 132 that identifies an amount of tokens for obtaining access to the resource 140. In other embodiments, the resource availability information 116 may further comprise any other suitable type of information associated with a resource 140. The resource availability information 116 may comprise information about resources 140 that are available from the same entity or different entities. In other words, the resource availability information 116 may comprise information about resources 140 that are available from one or more companies or service providers.

In some embodiments, the resource management device 104 may periodically query one or more network devices 106 for their resource availability information 116. In this case, the resource management device 104 may send a request for resource availability information 116 every thirty minutes, every hour, every twelve hours, every day, or at any other suitable time interval. In other embodiments, a network device 106 may be configured to periodically send the resource availability information 116 to the resource management device 104 without waiting for a request from the resource management device 104.

At operation 204, the resource management device 104 receives a resource information request 120 from a user device 102. The user device 102 sends the resource information request 120 to the resource management device 104 to request information about the resources 140 that are currently available within the network 110. The resource management device 104 may receive the resource information request 120 from the user device 102 via a message, an Application Programming Interface (API), or any other suitable messaging technique. In one embodiment, the resource information request 120 comprises location information for the user device 102. The location information identifies a physical location where a user and the user device 102 are currently located. Examples of location information include, but are not limited to, GPS coordinates, a physical address, or any other suitable type of information that identifies a physical location of the user device 102.

At operation 206, the resource management device 104 sends resource availability information 116 to the user device 102. Here, the resource management device 104 sends a portion of the resource availability information 116 to the user device 102 based on the location information for the user device 102. For example, the resource management device 104 may use the location information for the user device 102 to identify resources 140 that are available within a predetermined distance of the user device 102. In this example, the resource management device 104 may compare the location information for the user device 102 to the location information 128 that is associated with each of the resources 140. The resource management device 104 then determines distances between the user device 102 and each of the resources 140. The resource management device 104 then compares the determined distances to a predetermined threshold value. The predetermined threshold value corresponds with a maximum distance between the user device 102 and a resource 140. The resource management device 104 then identifies the resources 140 that are associated with distances that are less than or equal to the predetermined threshold value. This process allows the resource management device 104 to filter the resources 140 based on their proximity to the user device 102. After identifying one or more resources 140 that are within the predetermined threshold value of the user device 102, the resource management device 104 then aggregates a subset of information that associated with the identified resources 140 and sends the information to the user device 102 as the resource availability information 116. In one embodiment, the resource management device 104 sends resource availability information 116 that identifies a type of resource 140 that is currently available, location information 128 for a network device 106 that is configured to provide a resource 140, and a token value that identifies an amount of tokens for obtaining access to the resource 140.

After providing the resource availability information 116, the user device 102 presents the resource availability information 116 to a user using a graphical user interface (e.g. a display or a touch screen). This allows the user to review the resources 140 that are currently available and their corresponding token values 132. The user may then provide a user input that identifies a resource 140 the user would like to reserve. The user device 102 determines which resource 140 was identified by the user and generates a resource reservation request 122 for the identified resource 140. The user device 102 then sends the resource reservation request 122 to the resource management device 104.

At operation 208, the resource management device 104 receives the resource reservation request 122 from the user device 102. In one embodiment, the resource reservation request 122 identifies a user identifier 136 for the user and a resource 140 that the user would like to reserve. Examples of user identifiers 136 include, but are not limited to, a name, an email address, a phone number, a member identifier, an alphanumeric code, or any other suitable type of value that uniquely identifies the user.

At operation 210, the resource management device 104 generates and stores a resource allocation 118 based on the resource reservation request 122. Here, the resource management device 104 generates a resource allocation 118 for the user that allows the user to request and use the resource allocation 118 at a later time. In one embodiment, the resource management device 104 first identifies the current token value 132 that is associated with the requested resource 140. The resource management device 104 then generates a resource allocation 118 that associates the user identifier 136 for the user, a resource identifier for the identified resource 140, location information 128 for the identified resource 140, and the current token value 132 for the identified resource 140. The resource management device 104 then associates the resource allocation 118 with a time interval 138 that identifies a deadline (e.g. a day and/or time) for using the resource allocation 118. The time interval 138 may be set to a value of twelve hours, twenty-four hours, two days, three days, one week, one month, or any other suitable duration of time. The resource management device 104 then stores the resource allocation 118 in memory (e.g. memory 114). After storing the resource allocation 118, the user can use the resource allocation 118 at a later time before the time interval 138 expires.

In some embodiments, the resource management device 104 may be configured to authenticate the user before generating or storing the resource allocation 118. In this case, the resource management device 104 may request user credentials for the user to authenticate the user's identity. Examples of user credentials include, but are not limited to, a username and password, an alphanumeric code, a Personal Identification Number (PIN), a biometric signal, or any other suitable type of information. The resource management device 104 may employ any suitable technique for authenticating the identity of the user generating and/or storing the resource allocation 118.

As an example for the process described above, the resource management device 104 may be configured to receive resource availability information 116 from network devices 106 that are configured as fuel pump terminals. In this example, each network device 106 may be in a different physical location from where fuel (e.g. gasoline) can be obtained. The resource availability information 116 identifies the location of each fuel pump terminal, resources 140 that correspond with different grades of fuel that are available at each fuel pump terminal, and token values 132 corresponding with each grade of fuel.

The user may use an application on their user device 102 to send a resource information request 120 to request information about the fuel resources that are near the user. The resource information request 120 comprises information about where the user is currently located. In response to receiving the resource information request 120, the resource management device 104 sends resource availability information 116 to the user device 102 based on the current location of the user. After receiving the resource availability information 116, the user device 102 may present the resource availability information 116 to the user via the application on their user device 102. For example, the user device 102 may display a first location where the user can obtain a first fuel grade, a second fuel grade, and a third fuel grade. The user device 102 may also display a second location where the user can also obtain the first fuel grade, the second fuel grade, and the third fuel grade. The user device 102 may repeat this process to display any other locations where the user can obtain different types of fuel resources. In this example, each fuel grade for each location is associated with a token value 132 that corresponds with the price of the fuel grade. For instance, a first fuel grade may be associated with a first token value 132 that identifies a first price per gallon or liter, a second fuel grade may be associated with a second token value 132 that identifies a second price per gallon or liter, and so on. The user device 102 may also display information about how long a fuel resource reservation will be valid after generating the fuel resource reservation. For example, the user device 102 may indicate that a fuel resource reservation will only be valid for one day, two days, three days, one week, one month, or any other suitable duration of time. The amount of time that is displayed to the user corresponds with the time interval 138 that is used by the resource management device 104 when a resource allocation 118 is generated.

The user may then use a graphical user interface (e.g. a touch screen) on their user device 102 to select a fuel grade at a particular location to reserve. For instance, the user may use the touch screen on their user device to select the second fuel grade at the second location. In some instances, the user may also specify an amount of fuel resources, for example in gallons or liters, that they would like to obtain. In this case, the user may type in a numeric value or interact with the user interface on the application to indicate the amount of fuel resources they would like to obtain. The user device 102 then uses the user input to generate a resource reservation request 122 that identifies the user, the location identified by the user (e.g. the second location), the selected fuel grade (e.g. the second fuel grade), and the amount of requested fuel resources, if applicable. The user device 102 then sends the resource reservation request 122 to the resource management device 104 to generate a resource allocation 118. By sending the resource reservation request 122 to the resource management device 104, the user is requesting that the selected fuel resource be reserved for the user and locked at its current price. This process allows the user to lock in the current price for the fuel resource in case the price of the fuel resource increases in the future when the user tries to obtain the fuel resource. After sending the resource reservation request 122 to the resource management device 104, the user device 102 may display a confirmation or summary message to the user that indicates that their fuel reservation has been submitted.

After receiving the resource reservation request 122, the resource management device 104 generates a resource allocation 118 that associates the user with their selected fuel resource (i.e. fuel grade), location information for where to obtain the selected fuel resource, and the current token value 132 that identifies the current price for the selected fuel resource, and a time interval 138 that identifies a deadline for when the resource allocation 118 expires. The process of generating the resource allocation 118 locks the current price of the selected fuel resource for the user until the time interval 138 for the resource allocation 118 expires. In other words, this process allows the user to obtain the fuel resource at a future time for the current price or rate that is locked in the resource allocation 118. After generating the resource allocation 118, the resource management device 104 then stores the resource allocation 118 in memory (e.g. memory 114) for later use. In other examples, a similar process may be performed for any other suitable type of resource 140.

Authorizing Resource Allocations

Sometime after a resource allocation 118 has been generated, a user may use the resource allocation 118 by interacting with a network device 106 that is configured to provide the reserved resource 140. At operation 212, the resource management device 104 receives a reservation verification request 124 from the network device 106. In one embodiment, the reservation verification request 124 comprises a user identifier 136 for a user, a resource identifier for a resource 140, and location information for the network device 106. The location information for the network device 106 identifies a physical location for the network device 106. In some embodiments, the reservation verification request 124 may further comprise any other suitable type of information associated with resource 140 and/or the network device 106.

At operation 214, the resource management device 104 determines whether a resource reservation is approved. Here, the resource management device 104 compares the information from the reservation verification request 124 to the previously stored resource allocations 118 to determine whether or not to approve the resource reservation. The resource management device 104 first identifies a resource allocation 118 that is associated with the user identifier 136 from the reservation verification request 124. For example, the resource management device 104 may use the user identifier 136 as a search token to identify any resource allocations 118 that contain the user identifier 136. The resource management device 104 with then perform a series of validation checks to determine whether the resource reservation is valid and approved.

The resource management device 104 may first determine whether the location information for the network device 106 is within a predetermined distance from the location information 128 for the resource 140 in the resource allocation 118. For example, the resource management device 104 may compare the location information for the network device 106 to the location information 128 that is associated with the resource 140 in the resource allocation 118. The resource management device 104 then determines the distance between the network device 106 and the resource 140. The resource management device 104 then compares the determined distance to a predetermined threshold value. The predetermined threshold value corresponds with a maximum distance between the network device 106 and the resource 140. The resource management device 104 determines that the resource reservation is invalid when the distance between the network device 106 and the resource 140 is greater than the predetermined threshold value. Otherwise, the resource management device 104 determines that the resource reservation passes the location validation check when the distance between the network device 106 and the resource 140 is less than or equal to the predetermined threshold value.

In some instances, the resource management device 104 may check whether the location of the resource 140 in the resource allocation 118 is the same as the location of the network device 106. In this example, the resource allocation 118 may only be used at a specific location. In this case, the resource management device 104 determines that the resource reservation is invalid when the location of the resource 140 in the resource allocation 118 and the location of the network device 106 are not the same. Otherwise, the resource management device 104 determines that the resource reservation passes the location validation check when the location of the resource 140 in the resource allocation 118 and the location of the network device 106 are the same.

The resource management device 104 then checks whether the resource 140 in the resource allocation 118 matches the resource 140 identified in the reservation verification request 124. The resource management device 104 compares the resource identifier from the reservation verification request 124 with the resource information 130 in the resource allocation 118. For example, the resource management device 104 may compare the resource identifier from the reservation verification request 124 to a resource identifier in the resource allocation 118 to determine whether they match. The resource management device 104 determines that the resource reservation is invalid when the resource identifiers do not match. Otherwise, the resource management device 104 determines that resource reservation passes the resource type validation check when the resource identifiers match.

The resource management device 104 then checks whether the resource allocation 118 is still valid. Here, the resource management device 104 determines whether the resource allocation 118 has expired. As an example, the resource management device 104 may determine a current time and then compare the current time to the time interval 138 that is associated with the resource allocation 118. The resource management device 104 determines that the resource reservation is invalid when the current time is outside of the time interval 138 that is associated with the resource allocation 118. In this case, the resource management device 104 determines that the resource allocation 118 has expired and can no longer be used. Otherwise, the resource management device 104 determines that the resource allocation is still valid when the current time is within the time interval 138 that is associated with the resource allocation 118. In this case, the resource management device 104 determines that the resource reservation passes the active status validation check.

In response to determining that the resource reservation fails one or more of the validation checks, the resource management device 104 determines that the resource reservation is not approved and proceeds to operation 216. In this case, the resource management device 104 restricts access to the requested resource 140 for the user.

At operation 216, the resource management device 104 sends a reservation denied message 146 to the network device 106. The reservation denied message 146 indicates that the user is not permitted to access the requested resource 140. In some embodiments, the reservation denied message 146 comprises a reason or explanation for why the user has been denied access to the requested resource 140. As an example, the reservation denied message 146 may indicate that the resource allocation 118 has expired. As another example, the reservation denied message 146 may indicate that there is a mismatch between the requested resource 140 and the resource 140 in the resource allocation 118. As another example, the reservation denied message 146 may indicate that there is a mismatch between the location of the network device 106 and the location of the resource 140 in the resource allocation 118. In other examples, the reservation denied message 146 may provide any other suitable type of explanation for the user. After generating the reservation denied message 146 may indicate, the resource management device 104 sends the reservation denied message 146 to the network device 106. The resource management device 104 may use any suitable messaging technique to send the reservation denied message 146 to the network device 106. In response to receiving the reservation denied message 146, the network device 106 may present the reservation denied message 146 to the user using a graphical user interface on the network device 106.

Returning to operation 216, in response to determining that the resource reservation passes all of the validation checks, the resource management device 104 determines that the resource reservation is approved and proceeds to operation 218. In this case, the resource management device 104 will generate resource allocation instructions 126 that will allow the user to access the requested resource 140. At operation 218, the resource management device 104 generates resource allocation instructions 126. The resource allocation instructions 126 comprise instructions for authorizing access to the requested resource 140 at the token value 132 that is identified in the resource allocation 118. The resource allocation instructions 126 may comprise a token, code, scripts, instructions (e.g. machine-executable instructions), or any other suitable type of information that can be used by the network device 106 to override the current token value 132 with the token value 132 identified by the resource allocation 118.

In some embodiments, the resource management device 104 may select whichever token value 132 is smaller between the token value 132 identified in the resource allocation 118 and the current token value 132 for the requested resource 140. For example, the resource management device 104 compares the token value 132 identified in the resource allocation 118 and the current token value 132 for the requested resource 140 and selects the smaller of the two token values 132. In this case, the resource management device 104 generates resource allocation instructions 126 that comprise instructions for using the smaller token value 132.

At operation 220, the resource management device 104 sends the resource allocation instructions 126 to the network device 106. The resource management device 104 may use any suitable messaging technique to send the resource allocation instructions 126 to the network device 106. After sending the resource allocation instructions 126, the network device 106 may adjust the current token value 132 for the resource 140 to the token value 132 indicated in the resource allocation instructions 126. In some embodiments, the network device 106 may further reduce the token value 132 based on any additional information provided by the user. After adjusting the token value 132 for the resource 140, the user may then obtain the requested resource at the new token value 132.

Continuing with the previous example where a user generates a resource allocation 118 to reserve a fuel resource, the user may use the resource allocation 118 by interacting with a network device 106 that is configured as a fuel pump terminal. In this example, the user may interact with a user interface on the fuel pump terminal to request access to their reserved fuel resource. For instance, the user may provide a user identifier 136 (e.g. a member identifier) and select a fuel grade on the fuel pump terminal. In response to receiving the user's input, the fuel pump terminal generates a reservation verification request 124 that identifies the user, the location of the fuel pump terminal, and the selected fuel grade. The fuel pump terminal then sends the reservation verification request 124 to the resource management device 104 for authorization.

After receiving the reservation verification request 124, the resource management device 104 performs a series of validation checks to determine whether to authorize the user's request. The resource management device 104 first uses the user identifier 136 to search for any resource allocations 118 that are associated with the user. After locating the resource allocation 118 for the user, the resource management device 104 then compares the information from the resource allocation 118 with the information provided in the reservation verification request 124. The resource management device 104 may first determine whether the location information for the fuel pump terminal is within a predetermined distance from the location information for the resource 140 in the resource allocation 118. The resource management device 104 may also determine whether the selected fuel grade matches the fuel grade identified in the resource allocation 118. The resource management device 104 may also determine whether the current time is within the time interval 138 identified in the resource allocation 118. If the information provided in the reservation verification request 124 passes the validation checks, the resource management device 104 generates resource allocation instructions 126 that authorizes the release of the selected fuel grade at the price corresponding with the token value 132 identified in the resource allocation 118. In other words, the resource management device 104 sends resource allocation instructions 126 that allow the user to obtain the fuel resource for the price that was locked in when the resource allocation 118 was created instead of the current price for the fuel resource. The resource management device 104 sends the resource allocation instructions 126 to the fuel pump terminal to authorize the release of the fuel resource to the user. In response to receiving the resource allocation instructions 126, the fuel pump terminal adjusts the current price (i.e. the current token value 132) for the fuel resource to the price identified by the token value 132 in the resource allocation instructions 126 and then releases the fuel resource to the user. In other examples, a similar process may be performed for authorizing and releasing any other suitable type of resource 140.

Hardware Configuration for the Resource Management Device

Figure 3:
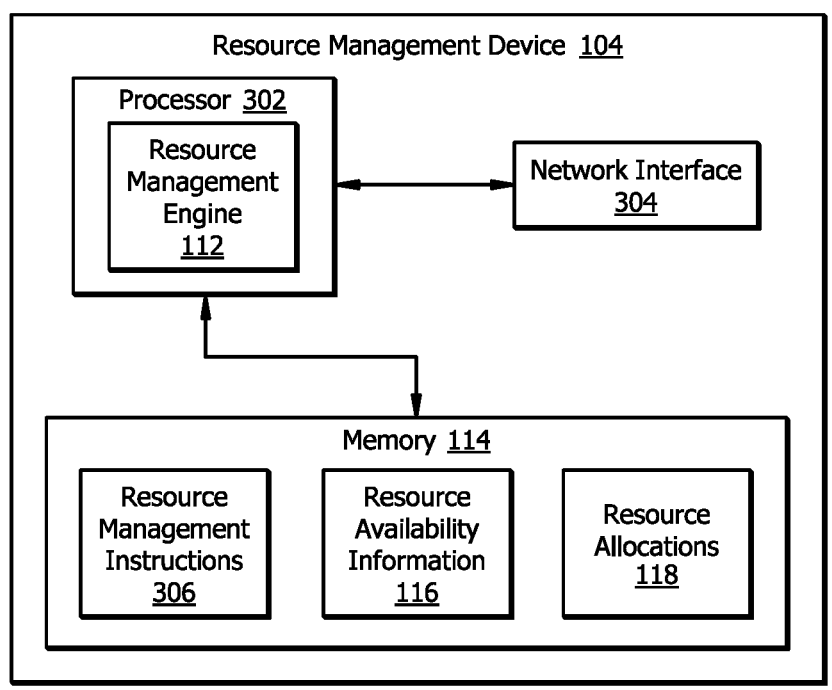
FIG. 3 is an embodiment of a resource management device for the computer network.

FIG. 3 is an embodiment of a resource management device 104 for the computer system 100. As an example, the resource management device 104 may be a server or a computer. The resource management device 104 comprises a processor 302, a memory 114, and a network interface 304. The resource management device 104 may be configured as shown or in any other suitable configuration.

Processor

The processor 302 is a hardware device that comprises one or more processors operably coupled to the memory 114. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 114 and the network interface 304. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute resource management instructions 306 to implement the resource management engine 112. In this way, processor 302 may be a special-purpose computer designed to implement the functions disclosed herein. In an embodiment, the resource management engine 112 is implemented using logic units, FPGAs, ASICs, DSPs, or any other suitable hardware. The resource management engine 112 is configured to operate as described in FIGS. 1 and 2. For example, the resource management engine 112 may be configured to perform the operations of process 200 as described in FIG. 3.

Memory

The memory 114 is a hardware device that is operable to store any of the information described above with respect to FIGS. 1 and 2 along with any other data, instructions, logic, rules, or code operable to implement the function(s) described herein when executed by the processor 302. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store resource management instructions 306, resource availability information 116, resource allocations 118, and/or any other data or instructions. The resource management instructions 506 may comprise any suitable set of instructions, logic, rules, or code operable to execute the resource management engine 112. The resource availability information 116 and the resource allocations 118 are configured similar to the resource availability information 116 and the resource allocations 118 described in FIGS. 1 and 2, respectively.

Network Interface

The network interface 304 is a hardware device that is configured to enable wired and/or wireless communications. The network interface 304 is configured to communicate data between user devices 102, network devices 106, the server 108, and other devices, systems, or domains. For example, the network interface 304 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A resource management device, comprising:
   a memory operable to store resource availability information, wherein the resource availability information comprises information about resources that are currently available within a network; and
   a processor operably coupled to the memory, configured to:
   receive a resource information request from a user device, wherein the resource information request comprises location information for the user device;
   send resource availability information to the user device based on the location information for the user device, wherein the resource availability information identifies:
      a plurality of available resources within the network based on the location information for the user device; and
      a token value for each available resource among the plurality of available resources;
   receive a resource reservation request from the user device, wherein the resource reservation request identifies:
      a user identifier for a user; and
      a first resource from among the plurality of available resources within the network;
   identify a first token value that corresponds with the first resource;
   generate a resource allocation that comprises an association between the user identifier, the location information for the first resource, a first resource identifier for the first resource, and the first token value;
   associate the resource allocation with a first time interval indicating a deadline for using the resource allocation;
   receive a reservation verification request from a network device, wherein the reservation verification request identifies:
      the user identifier;
      a second resource identifier; and
      location information for the network device;
   identify the resource allocation associated with the user identifier;
   determine the location information for the network device is within a predetermined distance from the location information for the first resource;
   determine the first resource identifier matches the second resource identifier;
   determine a current time is within the first time interval;
   generate resource allocation instructions authorizing access to the first resource in exchange for the first token value; and
   send the resource allocation instructions to the network device.

2. The device of claim 1, wherein the processor is further configured to determine the first token value is less than a current token value for the first resource before generating the resource allocation instructions.

3. The device of claim 1, wherein determining the location information for the network device is within the predetermined distance from the location information for the first resource comprises determining the network device and the first resource are at the same location.

4. The device of claim 1, wherein the processor is further configured to periodically query a plurality of network devices for the resource availability information.

5. The device of claim 1, wherein the processor is further configured to authenticate the user before generating the resource allocation.

6. The device of claim 1, wherein the resource availability information comprises information about resources that are currently available from the same entity.

7. The device of claim 1, wherein the resource availability information comprises information about resources that are currently available from a plurality of entities.

8. A resource allocation method, comprising:
   receiving a resource information request from a user device, wherein the resource information request comprises location information for the user device;
   sending resource availability information to the user device based on the location information for the user device, wherein the resource availability information identifies:
      a plurality of available resources within the network based on the location information for the user device; and
      a token value for each available resource among the plurality of available resources;
   receiving a resource reservation request from the user device, wherein the resource reservation request identifies:
      a user identifier for a user; and
      a first resource from among the plurality of available resources within the network;
   identifying a first token value that corresponds with the first resource;
   generating a resource allocation that comprises an association between the user identifier, the location information for the first resource, a first resource identifier for the first resource, and the first token value;
   associating the resource allocation with a first time interval indicating a deadline for using the resource allocation;
   receiving a reservation verification request from a network device, wherein the reservation verification request identifies:
      the user identifier;
      a second resource identifier; and
      location information for the network device;
   identifying the resource allocation associated with the user identifier;
   determining the location information for the network device is within a predetermined distance from the location information for the first resource;

determining the first resource identifier matches the second resource identifier;
determining a current time is within the first time interval;
generating resource allocation instructions authorizing access to the first resource in exchange for the first token value; and
sending the resource allocation instructions to the network device.

9. The method of claim 8, further comprising determining the first token value is less than a current token value for the first resource before generating the resource allocation instructions.

10. The method of claim 8, wherein determining the location information for the network device is within the predetermined distance from the location information for the first resource comprises determining the network device and the first resource are at the same location.

11. The method of claim 8, further comprising periodically querying a plurality of network devices for the resource availability information.

12. The method of claim 8, further comprising authenticating the user before generating the resource allocation.

13. The method of claim 8, wherein the resource availability information comprises information about resources that are currently available from the same entity.

14. The method of claim 8, wherein the resource availability information comprises information about resources that are currently available from a plurality of entities.

15. A computer program product comprising executable instructions stored in a non-transitory computer-readable medium that when executed by a processor causes the processor to:
receive a resource information request from a user device, wherein the resource information request comprises location information for the user device;
send resource availability information to the user device based on the location information for the user device, wherein the resource availability information identifies:
a plurality of available resources within the network based on the location information for the user device; and
a token value for each available resource among the plurality of available resources;
receive a resource reservation request from the user device, wherein the resource reservation request identifies:
a user identifier for a user; and
a first resource from among the plurality of available resources within the network;
identify a first token value that corresponds with the first resource;
generate a resource allocation that comprises an association between the user identifier, the location information for the first resource, a first resource identifier for the first resource, and the first token value;
associate the resource allocation with a first time interval indicating a deadline for using the resource allocation;
receive a reservation verification request from a network device, wherein the reservation verification request identifies:
the user identifier;
a second resource identifier; and
location information for the network device;
identify the resource allocation associated with the user identifier;
determine the location information for the network device is within a predetermined distance from the location information for the first resource;
determine the first resource identifier matches the second resource identifier;
determine a current time is within the first time interval;
generate resource allocation instructions authorizing access to the first resource in exchange for the first token value; and
send the resource allocation instructions to the network device.

16. The computer program product of claim 15, further comprising instructions that when executed by the processor causes the processor to determine the first token value is less than a current token value for the first resource before generating the resource allocation instructions.

17. The computer program product of claim 15, wherein determining the location information for the network device is within the predetermined distance from the location information for the first resource comprises determining the network device and the first resource are at the same location.

18. The computer program product of claim 15, further comprising instructions that when executed by the processor causes the processor to periodically query a plurality of network devices for the resource availability information.

19. The computer program product of claim 15, wherein the resource availability information comprises information about resources that are currently available from the same entity.

20. The computer program product of claim 15, wherein the resource availability information comprises information about resources that are currently available from a plurality of entities.

* * * * *